Nov. 28, 1961    H. C. SMITH    3,010,340
VALVE OPERATOR ARRANGEMENT
Filed Nov. 17, 1959
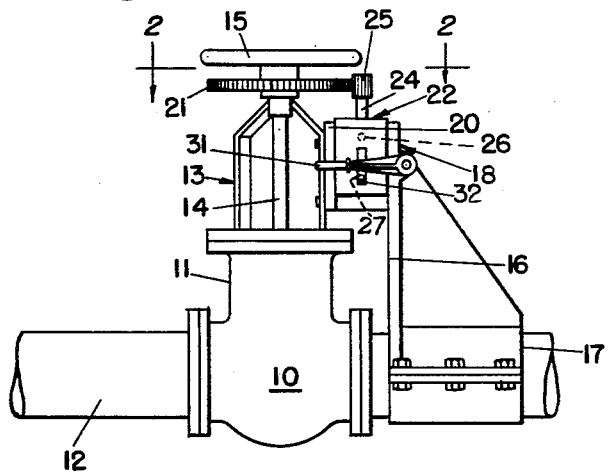
Fig. 1
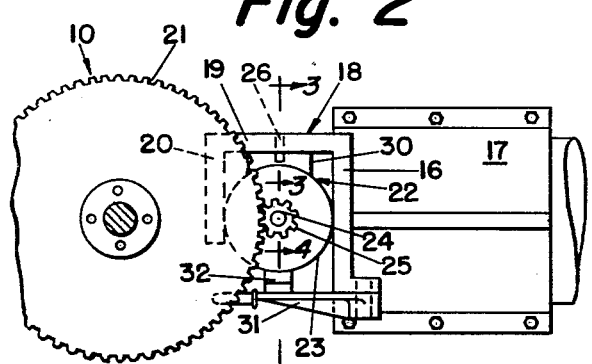
Fig. 2
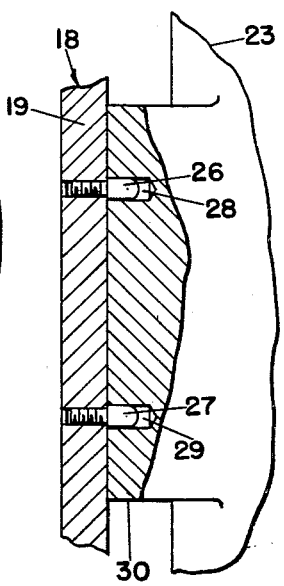
Fig. 3
Fig. 4
INVENTOR.
HOWARD C. SMITH
BY
ATTORNEY

United States Patent Office 3,010,340
Patented Nov. 28, 1961

3,010,340
VALVE OPERATOR ARRANGEMENT
Howard C. Smith, Secane, Pa., assignor to Sun Oil Company, Philadelphia, Pa., a corporation of New Jersey
Filed Nov. 17, 1959, Ser. No. 853,581
1 Claim. (Cl. 74—625)

This invention relates to a valve operator arrangement, and more particularly to a portable powered arrangement adapted to be easily and rapidly applied to a valve, when powered operation thereof is desired.

Often, in industrial operations employing pipes for the movement of fluids, there are many valves which are not operated frequently enough to justify the cost of individual powered operators. For example, in tank farms, there are many rather large valves which are operated only occasionally, for example about once a month. Nevertheless, the aggregate time spent in manually opening and closing these valves is tremendous. By way of example, considering a single sixteen-inch valve with 100 pounds differential pressure betwen upstream and downstream. Manual operation of such a valve will take between fifteen and thirty minutes, depending on the condition of the valve; oftentimes, such operation even requires two men.

An object of this invention is to provide a novel portable, transitory powered arrangement, easily applied to any valve, for operating the same. Once applied to the valve, the portable valve operator is mechanically fixed and supported in position, and does not thereafter require the application of any manual holding or supporting force.

Another object is to provide a novel relatively inexpensive portable powered device which will speed up valve operation, thereby allowing any given valve operating area to be operated by fewer men.

The objects of this invention are accomplished, briefly, in the following manner:

At each valve which is to be operated, there is provided a supporting means in the form of a stand or bracket; this supporting means is stationary and is permanently attached to the respective valve. A portable and transitory operator assembly is adapted to be mounted on the supporting means, in operative position with respect to the handwheel of the valve. This operator assembly includes a small (portable) motor having an output shaft; a gear driven by this shaft meshes with gearing coupled or secured to the valve handwheel, thereby to cause rotation of such handwheel (and operation of the valve) when the motor is energized. A quick-releasable coupling is provided for locking the operator assembly in position on the supporting means, with the aforementioned gear operatively coupled to rotate the valve handwheel.

A detailed description of the invention follows, taken in conjunction with the accompanying drawing, wherein:

FIGURE 1 is an elevational view of a valve operator arrangement according to this invention, in operative position on a valve;

FIGURE 2 is a plan view of the valve operator arrangement, looking in the direction 2—2 of FIGURE 1;

FIGURE 3 is a sectional view of a portion of the positioning means, taken along line 3—3 of FIGURE 2; and FIGURE 4 is a sectional view of a portion of the locking means, taken along line 4—4 of FIGURE 2.

Refer first to FIGURE 1, which shows the valve operator arrangement of this invention in operative position on a valve 10 to be operated. The body 11 of valve 10 is connected by flanges to a length of pipe indicated generally by numeral 12. The valve 10 is of the common outside-stem-and-yoke (OS and Y) type, having a multi-arm yoke 13 which extends upwardly from body 11 and supports a valve operating shaft or stem 14 near the upper end thereof. The hub portion of a handwheel 15 is threadedly connected to the upper end of the shaft or stem 14, in a conventional manner; for example, the handwheel may be secured to an internally-threaded bushing (not shown) whose threads mate with external threads provided on stem 14. All of the construction so far described is quite conventional, so further details need not be given. Suffice it to say here that rotation of the handwheel 15 in one direction results in lowering of stem 14 to cause closing of valve 10, while rotation of this handwheel in the opposite direction results in raising of stem 14 to cause opening of the valve. With this type of gate valve, the handwheel 15 does not move vertically up or down, but merely rotates.

According to this invention, each valve to be operated has permanently attached thereto a stationary supporting means in the form of a light yet rigid upstanding metallic column 16, made of structural steel, for example. At its base, the column 16 is secured to a ring-shaped clamping member 17 which is rigidly fastened (as by bolts) around the outside of pipe 12.

At the upper end of column 16, there is provided a bracket, denoted generally by numeral 18, which has the form in plan (see FIGURE 2) of an open-sided hollow rectangle, or an inverted U. Column 16 forms one side of bracket 18, while the remaining two sides thereof are formed, respectively, by a plate member 19 which extends outwardly at right angles from the larger face of rectangular column 16 and is secured thereto (e.g., by welding), and by a plate member 20 which extends at right angles from plate 19 and is parallel to, but spaced from, column 16. Members 19 and 20 may, if desired, comprise a single member having an L-shaped horizontal cross-section. Thus, the elements 16, 19, and 20 together form a rigid bracket in the form an open-sided hollow rectangle, or open-sided hollow square. Member 19 extends from column 16 toward valve yoke 13. For additional strength and rigidity, member 20 is preferably bolted to one of the arms of valve yoke 13 (see FIGURE 1).

As previously described, the column 16, together with the bracket 18 and a positioning and locking means to be hereinafter described, is a permanently-mounted structure at valve 10, and a similar structure is provided at each valve which is to be operated. As may be seen in FIGURE 1, the column 16 extends upwardly from pipe 12, toward handwheel 15. The bracket 18 at the upper end of this column is located between handwheel 15 and the body 11 of the valve, in the region of the valve yoke 13.

A spur gear wheel 21 is horizontally positioned below handwheel 15, this gear being fixedly secured (as by bolts, see FIGURE 2) to the hub of handwheel 15 and rotating therewith. Thus, only a minimum of modification of the valve operating parts is required. Rotation of gear 21, by the valve operator to be presently described, thus rotates handwheel 15 and operates valve 10. Gear 21 is located above the upper end of bracket 18 and above the yoke 13.

A portable and transistory valve operator assembly, denoted generally by numeral 22, is constructed and arranged to be supported in bracket 18. Assembly 22 comprises a small portable motor whose outer frame or housing 23 is generally cylindrical and is adapted to fit between the juxtaposed faces of column 16 and member 20, as illustrated in FIGURE 2. The assembly 22 is insertable into bracket 18 through the open side of the rectangle, and the insertion is made horizontally in FIGURE 1. The motor has an output shaft 24 the axis of which is substantially vertical when the assembly 22 is in operative position, as shown in FIGURE 1. Keyed to the upper end of motor shaft 24, and rotating with this shaft, is a pinion gear 25 which is adapted to engage or mesh with gear 21 secured to handwheel 15, when assembly 22 is in operative psition at the valve 10. When the motor of assembly 22 is energized, assuming that gears 25 and 21 are in mesh as described, motor shaft 24 rotates to rotate the driving gear 25, and the latter actuates the driven gear 21 to rotate handwheel 15 and thus to operate valve 10.

A quick-releasable coupling is provided for mounting the operator assembly 22 in position on the supporting means or bracket 18. This coupling, which includes positioning means and locking means, will now be described.

For the positioning means, two spaced, vertically-aligned, horizontally-extending pins 26 and 27 (see FIGURE 3) are firmly secured to plate member 19. These pins are located near the vertical midplane of member 19 (see FIGURE 2), and extend forwardly from this member, into the central hollow space of bracket 18. Matching apertures 28 and 29 are provided in a flattened boss-like protuberance 30 secured to motor frame 23, at one side thereof. The pins and apertures are so positioned that, when the pins 26 and 27 enter into the respective apertures 28 and 29, pinion 25 will be positioned to engage spur gear 21. It may be seen that pins 26 and 27 are positioned on that side of bracket 18 which is opposite to the open side thereof.

For the locking means, an arm 31 is pivotally secured to the front end of column 16, toward the upper end of this column. Arm 31 is adapted to pivot back and forth across the open side of bracket 18, see FIGURE 2. A projecting member 32 having an inclined or tapering camming surface on its outer side is secured to motor frame 23, at the side thereof opposite to protuberance 30. The midsection of arm 31 engages the camming surface of member 32, this camming surface being arranged to increase the effective depth of member 32 at the lower end thereof. Therefore, as arm 31 pivots in the counter-clockwise or downward direction in FIGURE 1, this arm, riding over the camming surface of member 32 (see FIGURE 4), forces motor frame 23 rearwardly in FIGURE 1, until the flattened side of protuberance 30 firmly engages the inner face of plate member 19.

It is again pointed out that one of each of the following items is permanently mounted at each valve which is to be operated: column 16, clamp 17, spur gear 21, and bracket 18, with its positioning pins 26 and 27 and its locking arm 31. Also, a single valve operator assembly 22, with its shaft 24, its pinion gear 25, its apertures 28 and 29, and its members 30 and 32, is utilized for all of the valves to be operated; this assembly 22 is capable of being mounted in position on or in a bracket 18, when operation of a particular valve is desired, by means of the quick-releasable coupling including items 26 through 32.

The motor of the operator assembly 22 may be a small electric motor, on the order of ¾ H.P., which would be sufficient to operate valves up to sixteen inches in size. The motor should be of the explosion-proof type, if the valves to be operated are in hazardous areas, and it should be of the reversible type, so that its output shaft 24 will rotate in one direction or the other (the particular direction being preselected, as desired) when the motor is energized. The motor should of course be provided with a start-stop switch (trigger switch), and as a necessary adjunct should also be provided with a torque switch of conventional type, which will prevent jamming of the valve being operated in either its full open or its full closed position, by cutting out the motor when the torque on shaft 24 becomes unduly high.

Of course, for an electric motor, electric power must be availabe to energize the same. However, this presents no great problem, since in most refinery or tank farm areas 110-volt power is readily available; an electric power receptacle could and should be permanently placed within a few feet of the valve. In some areas, the valves to be operated are isolated enough so that they are approached by jeeps or other vehicles. In this case, a truck-mounted engine-driven generator could easily be used, with the electric motor of the assembly 22 permanently electrically connected to this generator. Another possibility here would be a battery-operated power take-off, using the vehicle's storage batteries.

A valve operator assembly 22 as described previously is light enough to be carried by one man. However, to make it even lighter (which is particularly desirable for isolated areas), a rotary air motor may be used for the operator, instead of an explosion-proof electric motor. Such air motors can be easily reversed, as is necessary for the present device, and are ordinarily furnished with start-stop valves, as well as torque limiting devices. For air motors, a source of compressed air is needed. However, plant compressed air systems are quite common, even in tank farms, so that no particular problem is presented here. Truck-mounted air compressors, driven by gasoline engines, are also readily available, if no plant air system is at hand.

The small portable motor of the operator assembly (be it run by either electric power or compressed air) has an output shaft 24 which rotates (in a selected direction) when the motor is energized or supplied with power. The rotation of this motor shaft causes operation of the valve, in the manner previously described. Rotation of shaft 24 in one direction causes opening of the valve, and reversing of the motor causes closing of the valve.

With the valve operator arrangement of this invention, the time required for valve operation may be broken down into two general subdivisions, the first of which is getting the operator fully ready to operate, and the second of which is the opening or closing time.

In connection with the first subdivision just mentioned, the following explanation is given. As previously described, the operator assembly 22 is light enough to be easily carried by one man. When the man has reached the location of the valve to be operated, his procedure would be as follows: lift or pivot the arm 31 clockwise as far as possible (so that access to the open side of bracket 18 can be had), slide the operator assembly 22 into bracket 18 from the open side thereof (lowering the assembly below its operating or installed position, if necessary, to clear arm 31) until pins 26 and 27 enter into the respective apertures 28 and 29 for positioning, pivot the arm 31 counterclockwise for camming or pushing the operator assembly "home," plug the motor power cord into the adjacent power receptacle, and pull the motor trigger switch. All of this should not take more than thirty seconds. In case the motor power source (generator or air compressor) were carried by the vehicle, the time required would be even less, since in this case the motor would be already connected to the power source; then, the step of plugging the power cord into the receptacle could be omitted. It will be appreciated that the reverse of the above-described procedure would be used to remove the valve operator assembly from the valve.

In connection with the installation of the operator assembly at the valve as previously described, it is pointed out that the meshing of pinion 25 with gear 21 will present no difficulties during the sliding of the operator assembly 22 into bracket 18, and during the locking of the operator assembly in position in this bracket. This is so because the motor shaft 24 is free to rotate when no power is applied to the motor; therefore, the pinion 25 can turn freely into proper mesh with gear 21 as the operator assembly 22 moves toward the rear of bracket 18 (see FIGURE 3).

In connection with the second subdivision previously mentioned, the following should be noted. Again referring to a sixteen-inch valve with 100 pounds differential pressure between upstream and downstream, a valve operator whose motor shaft 24 rotates at 2400 r.p.m. would open or close this valve in 7½ minutes (it should be apparent that a speed reduction, and a consequent torque increase, occurs by virtue of the small pinion 25 driving the large gear 21). This time of 7½ minutes contrasts sharply with hand or manual operation of a similar valve (such operation sometimes requiring two men) which, as previously mentioned, will take between fifteen and thirty minutes.

Although it has previously been suggested that the spur gear 21 may be bolted to the (enlarged) hub of handwheel 15, below such handwheel, other constructions are possible. One such construction (and perhaps a preferable one) would be to attach the spur gear in a different manner to any existing handwheel, for example by means of suitable clamps and/or bolts, the clamps engaging the spokes of the handwheel.

It is pointed out that the supporting means 16, 17, 18 (provided at each valve) is quite simple and inexpensive, and that the portable operator assembly 22 (only one of which is called for) is rather simple in design and is relatively inexpensive. Also, the gearing 21 for each handwheel is inexpensive. At the same time, the aggregate of the man-hours saved in operating the valves is tremendous.

It is desired to be pointed out that, when the assembly 22 has been placed in operative position as described above, it is locked in position in bracket 18, and it is mechanically supported by this bracket. This renders unnecessary any further manual holding or supporting force. Thus, during the valve operation time (which may be considerable, at least as compared to the time required for getting the operator fully ready to operate), no manual holding or supporting force need be applied. This is an important feature of the invention, which reduces to a minimum the manual energy necessary to be expended for valve operation.

The invention claimed is:

In a motor mount for a portable, transitory valve operator or the like, stationary supporting means provided with means for permanently mounting the same adjacent a valve to be operated; a plurality of spaced pins secured to said supporting means and adapted to extend into respective apertures provided in one side of the frame of the motor, and a quick-releasable coupling for locking the motor in position on said supporting means, said coupling comprising an arm pivotally secured to said supporting means and adapted to engage a camming surface provided on that side of the motor frame which is opposite to said one side; the motor driving a gear which meshes with a mating gear secured to the handwheel of the valve, when the motor is in operative position on said supporting means.

References Cited in the file of this patent

UNITED STATES PATENTS

| | | |
|---|---|---|
| 214,758 | Condit | Apr. 29, 1879 |
| 291,162 | De Maine | Jan. 1, 1884 |
| 1,792,570 | Breuer | Feb. 17, 1931 |
| 2,162,400 | Heath | June 13, 1939 |
| 2,250,142 | Umstead | July 22, 1941 |
| 2,572,506 | Mongelli et al. | Oct. 23, 1951 |
| 2,709,062 | Lamb | May 24, 1955 |
| 2,815,922 | Thomas | Dec. 10, 1957 |